US011528644B2

(12) United States Patent
Cheng

(10) Patent No.: US 11,528,644 B2
(45) Date of Patent: Dec. 13, 2022

(54) METHOD OF HANDLING CELL SELECTION AND RELATED NETWORK DEVICE AND MOBILE DEVICE

(71) Applicant: ACER INCORPORATED, New Taipei (TW)

(72) Inventor: Ching-Wen Cheng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 15 days.

(21) Appl. No.: 16/986,276

(22) Filed: Aug. 6, 2020

(65) Prior Publication Data
US 2021/0068013 A1 Mar. 4, 2021

Related U.S. Application Data

(60) Provisional application No. 62/891,565, filed on Aug. 26, 2019.

(51) Int. Cl.
*H04W 36/00* (2009.01)
*H04W 48/16* (2009.01)
*H04W 84/04* (2009.01)

(52) U.S. Cl.
CPC ....... *H04W 36/0072* (2013.01); *H04W 48/16* (2013.01); *H04W 84/042* (2013.01)

(58) Field of Classification Search
CPC ............. H04W 36/0072; H04W 48/16; H04W 84/042; H04W 36/0022; H04W 36/0058; H04W 36/0066; H04W 36/34; H04B 7/18541
See application file for complete search history.

(56) References Cited

U.S. PATENT DOCUMENTS

| 5,678,184 A | 10/1997 | Cutler, Jr |
| 2010/0124934 A1* | 5/2010 | Mach .................... H04W 24/02 455/456.1 |
| 2013/0077507 A1 | 3/2013 | Yu |
| 2013/0244647 A1 | 9/2013 | Makh |

(Continued)

FOREIGN PATENT DOCUMENTS

| EP | 0 637 142 A1 | 2/1995 |
| EP | 1 379 013 A1 | 1/2004 |

(Continued)

OTHER PUBLICATIONS

Nokia (Email Discussion Rapporteur), Report of Email Discussion [106#72] [NR/NTN] TP on NTN-TN Service continuity, 3GPP TSG-RAN WG2 Meeting #107, Prague, CZ, Aug. 26-30, 2019, R2-1910692, pp. 1-16, XP051768463.

(Continued)

*Primary Examiner* — Wayne H Cai
(74) *Attorney, Agent, or Firm* — Winston Hsu

(57) ABSTRACT

The present invention provides a method of providing configuration of cell search information for a network device of a non-terrestrial network (NTN). The network device has a serving cell on which a mobile device is allowed to camp. The method includes a step of transmitting at least one location information of reference points for the configuration of cell search information for at least one mobile device, to configure the mobile device to determine whether to perform cell search for cell reselection according to the configuration of cell search information.

32 Claims, 6 Drawing Sheets

(56) References Cited

U.S. PATENT DOCUMENTS

| | | | |
|---|---|---|---|
| 2014/0051447 A1* | 2/2014 | Li | H04W 36/00835 |
| | | | 455/437 |
| 2016/0323800 A1 | 11/2016 | Ulupinar | |
| 2017/0181068 A1* | 6/2017 | Salim | H04W 36/30 |
| 2019/0037425 A1 | 1/2019 | Hong | |
| 2019/0239147 A1* | 8/2019 | Chun | H04W 48/16 |
| 2020/0045707 A1* | 2/2020 | Hwang | H04L 5/0053 |
| 2021/0219228 A1* | 7/2021 | Matsuda | H04W 48/18 |
| 2021/0315023 A1* | 10/2021 | Tesanovic | H04W 74/0841 |
| 2022/0150818 A1* | 5/2022 | Liberg | H04B 7/18539 |

FOREIGN PATENT DOCUMENTS

| | | |
|---|---|---|
| EP | 3 301 979 A1 | 4/2018 |
| JP | 2014-523719 A | 9/2014 |
| JP | 2016-516345 A | 6/2016 |
| KR | 10-2014-0140577 A | 12/2014 |
| KR | 10-2019-0012096 A | 2/2019 |
| WO | 2007/047370 A2 | 4/2007 |

OTHER PUBLICATIONS

Nokia, Sony, Huawei, Vodafone, Merged TP on TN-NTN service continuity scenarios, 3GPP TSG-RAN WG2 Meeting #106, Reno, USA, May 13-17, 2019, R2-1908242, pp. 1-4, XP051740395.

Ericsson, Cell selection/reselection for NTN GEO and LEO, 3GPP TSG-RAN WG2 #106, Tdoc R2-1907162, Reno, Nevada, US, May 13-17, 2019, pp. 1-4.

* cited by examiner

METHOD OF HANDLING CELL SELECTION AND RELATED NETWORK DEVICE AND MOBILE DEVICE

CROSS REFERENCE TO RELATED APPLICATIONS

This application claims the benefit of U.S. Provisional Application No. 62/891,565, filed on Aug. 26, 2019, the contents of which are incorporated herein by reference.

BACKGROUND OF THE INVENTION

1. Field of the Invention

The present invention relates to a method utilized in a wireless communication system, and more particularly, to a method of handling cell selection or reselection in a wireless communication system.

2. Description of the Prior Art

In the long-term evolution (LTE) system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway (SGW), an access and mobility management function (AMF), a user plane function (UPF), etc., for a non-access stratum (NAS) control and/or data transmission. The LTE-advanced (LTE-A) system is an evolution of the LTE system, targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3rd Generation Partnership Project (3GPP) Rel-1X standard or later versions.

The fifth generation (5G) system (e.g., 5G new radio access network (5G-NR)) is an evolution of a continuous mobile broadband process to meet the requirements of 5G as introduced by International Mobile Telecommunications (IMT)-2020. The 5G system may include a radio access network (RAN) and a core network (CN). The RAN may include at least one base station (BS). The at least one BS may include an evolved Node-B (eNB) or a 5G Node-B (gNB), for communicating with at least one UE and for communicating with the CN. The CN may include an access and mobility management function (AMF), a user plane function (UPF), etc., for a NAS control and/or data transmission.

The 3GPP standard specifies the communications between non-terrestrial networks (NTN) and UEs complying with 5G-NR. An NTN, as opposite to a terrestrial network (TN), is implemented with non-terrestrial network nodes such as a satellite, an Unmanned Aerial System (UAS) access node, a High Altitude Platform Station (HAPS), etc. The beam footprint coverage of the NTN (i.e., the coverage of an NTN beam on the ground) may be served as an NTN cell, which may cover a wide range of area on the ground. As shown in FIG. 1, the coverage of an NTN cell may be far greater than the coverage of a TN cell, and there may be a great number of TN cells in the coverage of an NTN cell. For example, a low earth orbit (LEO) satellite at the altitude of 600 km may provide a beam footprint coverage (i.e., a cell) having 200 km diameter. In general, in an NTN cell, the variations of signal strength and quality between the central and the boundary of the cell are not as significant as that of a TN cell.

The 5G system shall support service continuity between a terrestrial access network and a non-terrestrial access network owned by the same operator or owned by 2 different operators. In other words, a NR-capable UE should be able to smoothly move from a TN to an NTN or from an NTN to a TN. However, the currently available cell selection or reselection mechanism may not be well applicable to a UE searching for different types of networks, e.g., a UE served by (e.g., camped on) an NTN searching for a TN.

SUMMARY OF THE INVENTION

It is therefore an objective of the present invention to provide a novel cell selection or reselection method for a terrestrial network (TN) and non-terrestrial network (NTN) capable UE, in order to save the UE power in performing cell reselection when the UE is served by (e.g., camped on) the NTN.

An embodiment of the present invention discloses a method of handling cell search for a network device of an NTN having a serving cell on which a mobile device is camped. The method comprises a step of transmitting location information of reference points associated with a coverage of the serving cell to the mobile device, to configure the mobile device to determine whether to search a TN cell according to the location information of reference points.

Another embodiment of the present invention discloses a network device of an NTN having a serving cell on which a mobile device is camped. The network device is configured to handle cell search and comprises a processor and a memory. The processor is configured to execute a program code. The memory, coupled to the processor, is configured to store the program code which instructs the processor to perform the following step: transmitting location information of reference points associated with a coverage of the serving cell to the mobile device, to configure the mobile device to determine whether to search a TN cell according to the location information.

Another embodiment of the present invention discloses a method of handling cell search for a mobile device. The mobile device is in an inactive mode (e.g., in LTE RRC_INACTIVE state or in NR RRC_INACTIVE state) or an idle mode (e.g., in LTE RRC_IDLE state or NR RRC_IDLE state) served by (e.g., camped on) a serving cell of a first network. The method comprises steps of: receiving configuration of cell search information; and performing a cell search evaluation according to the configuration of cell search information; and performing a cell search according to the cell search evaluation result. The mobile device may further determine whether the configuration of cell search information comprises location information of reference points. The mobile device may perform a cell search of a second network according to the suggestion of the evaluation result.

Another embodiment of the present invention discloses a mobile device configured to handle cell search. The mobile device is in an inactive mode or an idle mode served by (e.g., camped on) a serving cell of a first network. The mobile device comprises a processor and a memory. The processor is configured to execute a program code. The memory, coupled to the processor, is configured to store the program code which instructs the processor to perform the following steps: receiving configuration of cell search information; further determining whether the configuration of cell search information comprises location information of reference points; and performing a cell search evaluation according to the configuration of cell search information. The mobile device may perform a cell search of a second network according to the suggestion of the evaluation result.

These and other objectives of the present invention will no doubt become obvious to those of ordinary skill in the art after reading the following detailed description of the preferred embodiment that is illustrated in the various figures and drawings.

DETAILED DESCRIPTION

According to specification of the 3rd Generation Partnership Project (3GPP), the UE may perform cell reselection under several situations.

The cell reselection evaluation may be performed by considering the priority of different cells (e.g., according to the operation frequency band of a cell, the PLMN of a cell, or according to the black/white list of cells) and the signal strength and quality detected by the UE. More specifically, the UE may perform intra-frequency cell reselection if the reference signal received power (RSRP) or reference signal received quality (RSRQ) or received signal strength indication (RSSI) of the current serving cell is less than a threshold. The UE may perform inter-frequency cell reselection if the frequency of a neighboring cell has a higher priority than the frequency of the current serving cell or if the RSRP or RSRQ or RSSI of the current serving cell is less than a threshold. The UE may perform inter radio access technology (inter-RAT) cell reselection if the frequency of a cell of another radio access technology is higher than the frequency of the current serving cell or if the RSRP or RSRQ or RSSI of the current serving cell is less than a threshold.

Figure 1:
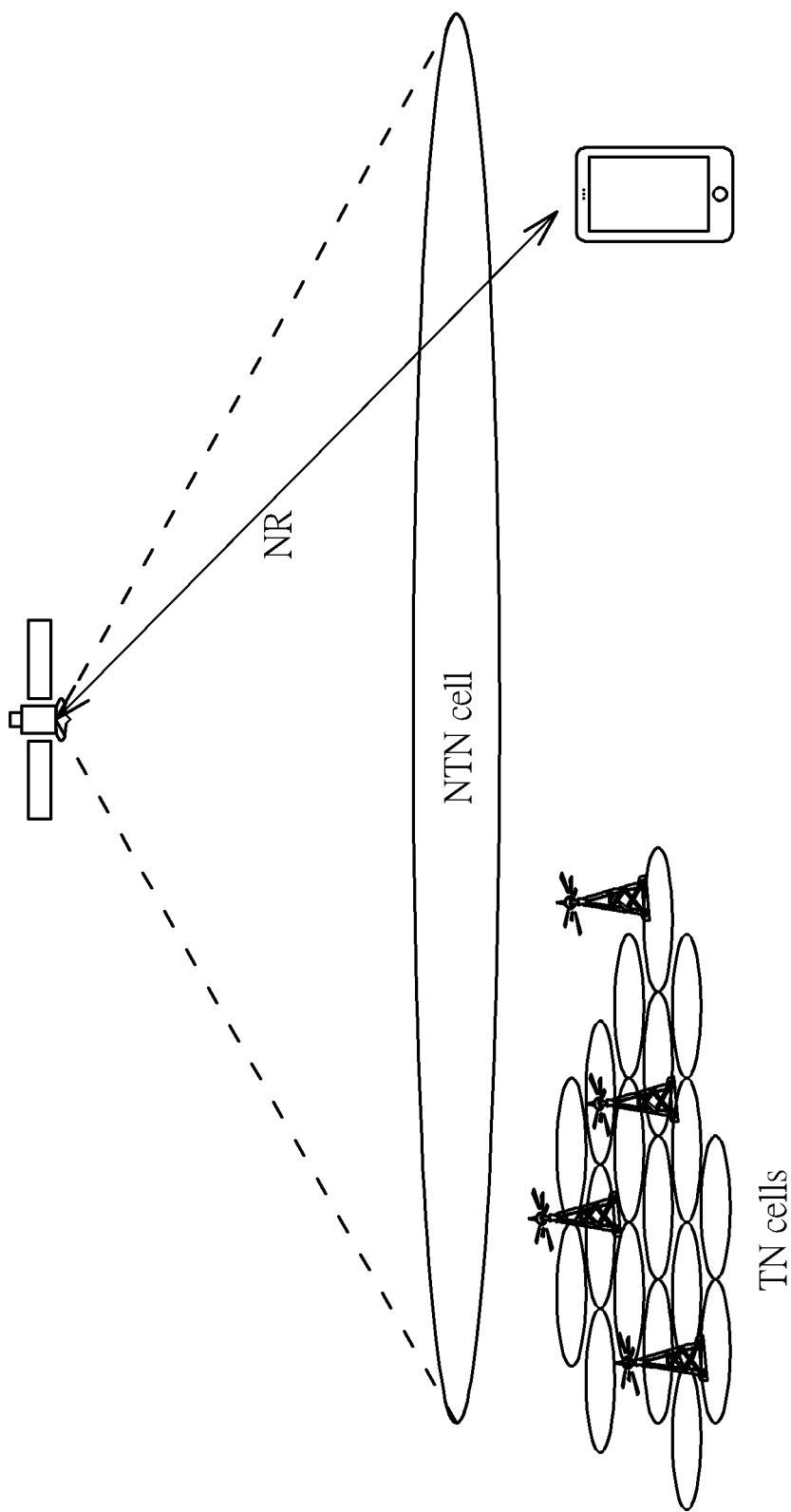
FIG. 1 is a schematic diagram of the coverage of an NTN cell and TN cell.
Figure 2:
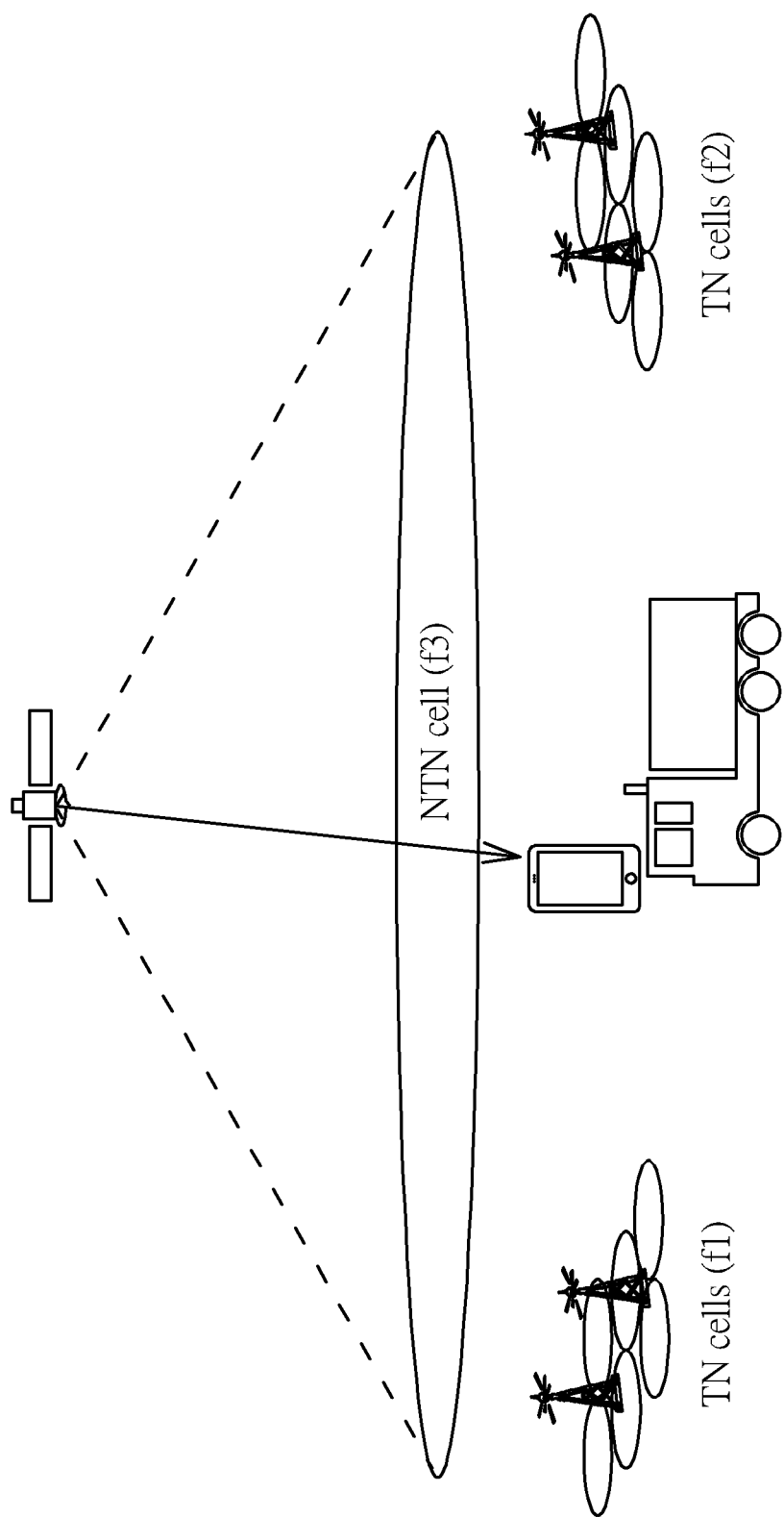
FIG. 2 is an exemplary scenario of service continuity between the NTN and TN.

As to the criteria of cell reselection with coexistence of a non-terrestrial network (NTN) and a terrestrial network (TN), please refer to FIG. 2, which is an exemplary scenario of service continuity between the NTN and TN. As shown in FIG. 2, the UE has NTN and TN connection capability and may be a mobile phone on a cargo truck moving from a city to another. The destination city is deployed with TN cells having a frequency f1, and the origin city is deployed with TN cells having a frequency f2. The coverage of an NTN cell (e.g., corresponding to the foot print of one or several beams of a satellite), having a frequency f3, may overlap the coverage of the TN cells in these two cities. Between the two cities, the UE may go through a far distance on an area without deployment of TN, where only NTN cells may be used. For the purpose of cell reselection, the NTN should broadcast the frequencies of neighboring cells to assist the UE through system information, where the information of frequencies f1, f2 and f3 may be included with or without priority configurations. Therefore, the UE may perform cell reselection based on the frequency information received from the NTN.

In general, a UE preferring TN cells (e.g., by configuration of the home/visiting/registered PLMN, or by manual configuration) may usually consider that a TN cell has a higher priority than an NTN cell for example by considering that the terrestrial system may be preferable due to less power consumption and/or lower communication fee. As shown in FIG. 2, when the UE preferring TN cells is in the original city deployed with TN cells having the frequency f2, the UE may be in the coverage of both the NTN cell (i.e., frequency f3) and the TN cell (i.e., frequency f2); hence, the UE may select the TN cell. When connected with the TN cell, the UE may receive frequency configuration for cell reselection from this TN cell. After the cargo truck leaves the city and the UE departs from the coverage of the TN cell, the UE may find that the signal quality is poor and thereby start to perform cell search for cell reselection. At this moment, the UE is only in the coverage of the NTN cell, and thus the UE may search and select the NTN cell with frequency f3 for the network service. The NTN cell may provide configuration information to assist UE performing intra-frequency, inter-frequency, and/or inter-RAT cell search for cell reselection. The configuration information may include frequencies or cell identities of neighboring cells, the frequencies may be associated with priorities. Subsequently, the UE may start to perform cell search for cell reselection based on the information received from the NTN cell. In this example, the information provided by the NTN cell may include the frequencies f1 and f2 corresponding to the TN cells overlapping this NTN cell. Note that the UE considers that the priority of the TN cell is higher than the priority of the NTN cell, and thus the UE would perform cell search for cell reselection to search for TN cells in the frequencies f1 and f2 based on the criteria of cell reselection.

However, it may take hours for the cargo truck to arrive at the destination city from the origin city. Therefore, the UE may perform cell search for cell reselection procedure for hours during the journey. It consumes battery power of the UE but the TN cells cannot be found until the cargo truck arrives at the destination city. On the other hand, if the NTN cell is configured with a higher priority than the TN cell to avoid power waste, the UE may start cell search for cell reselection procedure only when the signal strength or quality of the NTN cell becomes weak, e.g., the RSRP or RSRQ is less than a threshold. However, it is noted that the variations of signal strength and quality between the central and the boundary of the cell are not significant in an NTN cell; hence, the UE might not trigger cell search for cell reselection procedure even if it enters the coverage of a TN cell.

Please note that a UE such as a mobile phone is usually capable of the global navigation satellite system (GNSS) or global positioning system (GPS) functions. However, the GNSS or GPS capable UE may not possess the capability of geographic information system (GIS). In other words, the GPS information of the UE may not allow the UE to accurately determine whether to perform cell search or cell reselection for TN and/or NTN cells. For example, the GPS information may not show the frequencies of TN cells deployed in the city, or the operator(s) and related cells in the city.

In order to solve the problem that the UE cannot efficiently perform cell search for cell reselection between the NTN cell and the TN cell, the UE should be able to acquire the location information associated with the possible TN cells and their frequencies, and apply this information in an evaluation procedure of cell search for cell reselection. Therefore, the UE may save battery power searching for TN cells when it is still far away from any TN cells during the journey between two cities, even if the frequency information of the TN cells is provided from the serving NTN cell. Only when the TN cell and/or its corresponding reference point are in a reachable distance of the UE, the UE performs cell search for cell reselection of TN cells. Correspondingly, the network should provide the information of reference point(s) to the UE, where the information of reference point(s) allows the UE to determine whether it is approaching a reference point, and thereby determine whether to start cell search for cell reselection procedure or whether to stop searching the frequency for cell reselection.

Figure 3:
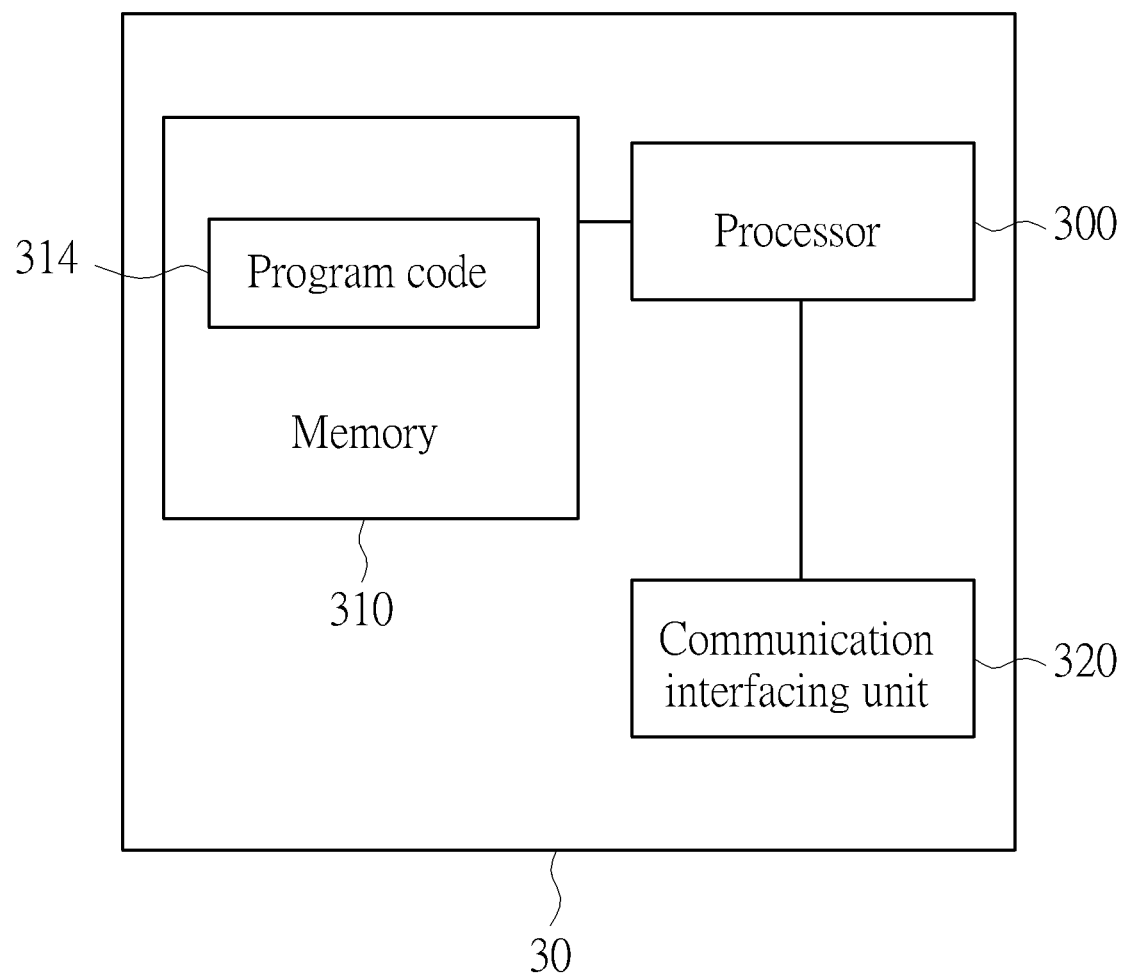
FIG. 3 is a schematic diagram of a communication device according to an embodiment of the present invention.

Please refer to FIG. 3, which is a schematic diagram of a communication device 30 according to an embodiment of the present invention. As shown in FIG. 3, the communication device 30 may include a processor 300 such as a microprocessor or application specific integrated circuit (ASIC), a memory 310 and a communication interfacing unit 320. The memory 310 may be any data storage device that may store a program code 314, accessed and executed by the processor 300. Examples of the memory 310 include but are not limited to a subscriber identity module, read-only memory, flash memory, random-access memory, hard disk, optical data storage device, non-volatile storage unit, non-transitory computer-readable medium (e.g., tangible media), etc. The communication interfacing unit 320 is preferably a transceiver and is used to transmit and receive signals (e.g., data, messages and/or packets) according to processing results of the processor 300.

The communication device 30 may be a mobile device or a network device, but is not limited herein. The mobile device may be, for example, a UE, a mobile phone, a tablet computer, an electronic book, a portable computer system or a vehicle, but is not limited thereto. In an exemplary embodiment, the mobile device may be a mobile phone on a cargo truck that travels between two cities as shown in FIG. 2. The network device may be, for example, a device of NTN providing functionalities and services of a NTN cell, a device of TN providing functionalities and services of a TN cell, a transmission reception point (TRP) of NTN, a TRP of TN, an eNB or gNB of NTN, an eNB or gNB of TN, but is not limited thereto. In an exemplary embodiment, the network device may be a device onboard of NTN provided functionalities and services via a satellite as shown in FIG. 2. In addition, the network device and the mobile device may be seen as a transmitter or a receiver. For an uplink (UL) transmission, the mobile device is the transmitter and the network device is the receiver, and for a downlink (DL) transmission, the network device is the transmitter and the mobile device is the receiver.

For the sake of simplicity, in the following embodiments, a UE and a gNB are used for illustrating the mobile device and the network device, respectively. It should be noted that the scope of the present invention is not limited thereto.

Figure 4:
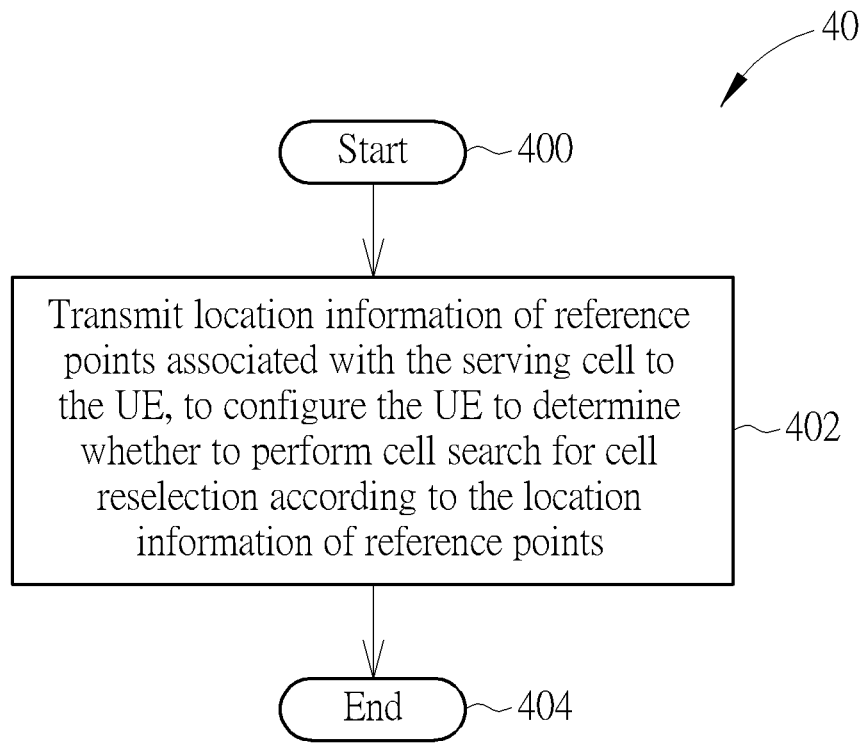
FIG. 4 is a flowchart of a process according to an embodiment of the present invention.

Please refer to FIG. 4, which is a flowchart of a process 40 according to an embodiment of the present invention. The process 40 may be utilized in a gNB of an NTN having a serving cell on which a UE is camped, for handling cell search for cell reselection. The process 40 may be compiled into the program code 314 and includes the following steps:

Step 400: Start.

Step 402: Transmit location information of reference points associated with the serving cell to the UE, to configure the UE to determine whether to perform cell search for cell reselection according to the location information of reference points.

Step 404: End.

According to the process 40, the gNB may provide location information of reference point(s) in the configuration of cell search information for a UE to perform cell search for cell reselection, and transmit the location information of reference points to the UE within the coverage of the serving cell of NTN gNB. Therefore, the UE may be configured to determine whether or when to perform cell search for cell reselection (e.g., according to the frequency or frequencies included in the configuration of cell search information) according to the received location information of reference points. In detail, the UE may be configured to start cell search for cell reselection when the location information of reference points indicates that there is a reference point corresponding to the TN cell in the reachable distance of the UE, or configured to stop cell search for cell reselection when the UE estimates and determines the location information of reference points suggesting that there is no reference point corresponding to the TN cell in the reachable distance of the UE.

The gNB may transmit the location information of reference points to the UE by any possible method. In the embodiments of the present invention, the location information of reference points may be contained in the system information to be broadcasted to the UE; hence, the UE may receive the location information of reference points in the system information even when it is in the idle mode or inactive mode.

In an embodiment, the gNB may broadcast the location information of reference points through a system information block (SIB) (e.g., SIB2). The SIB provides common information for every type of cell reselection. In such a situation, the UE may refer to the same location information of reference points for performing evaluation of cell search for cell reselection if the UE needs to perform intra-frequency cell reselection, inter-frequency cell reselection, or inter-RAT cell reselection.

In an embodiment, the gNB may provide the location information of reference points as a part of a field (e.g., cellReselectionInfoCommon) of a SIB, which is commonly applicable to intra-frequency, inter-frequency and inter-RAT cell reselection. Therefore, the UE may consider this location information of reference points when performing intra-frequency, inter-frequency or inter-RAT cell reselection. In an alternative embodiment, the gNB may provide the location information of reference points as a part of a field (e.g., cellReselectionServingFreqInfo) of a SIB, which is common for inter-frequency and inter-RAT cell reselection. Therefore, the UE may consider this location information of reference points when not performing cell search of the same RAT of the original frequency, i.e., performing inter-frequency or inter-RAT cell reselection. In such a situation, if the UE stays in the original frequency (e.g., performing intra-frequency cell reselection), this location information of reference points may not be considered to perform cell search for cell reselection.

Please note that the location information of reference points should be able to indicate the position of the geographical location associated with the TN cells. For example, the location information of reference points may include a position regarding a city such as a landmark of the city that may be a harbor, an airport, or a major road going through the city. The location information of reference point may be expressed as positioning information of the assisted GNSS (AGNSS) or assisted GPS (AGPS), such as a GPS coordinate, to be included in the location information of reference points. For example, each one of the location information of reference points may be expressed as an identity that uniquely identifies an area of a geographic location that is specified in a specification or defined by the serving network. For example, each one of the location information of reference points may be, but is not limited to, a sequence number of a reference point, a physical cell ID (PCI) of a TN cell, a PCI of an NTN gateway, a gNB ID, which are recorded in the location information of reference points.

In an embodiment, one or more public land mobile network (PLMN) ID corresponding to a reference point may also be included in the location information of reference points to be sent to the UE. For example, the PLMN ID corresponding to a reference point may be recorded with the ID of the reference point and the location information of the reference point. The PLMN IDs may be expressed as a PLMN ID list indicating one or more PLMNs providing TN services as neighboring cells of the NTN serving cell in the associated carrier frequency. The PLMN ID list is provided for the UE; hence, in addition to determining whether there is a reference point in the reachable distance of the UE, the UE is further allowed to determine whether the UE's reachable distance has a supported PLMN. For example, the supported PLMN may include, but is not limited to, a registered PLMN (RPLMN), an equivalent RPLMN (ER-PLMN), a home PLMN (HPLMN), and an equivalent HPLMN (EHPLMN). Even if there is a reference point in the reachable distance of the UE based on the location information of reference points, the UE may not perform cell search for cell reselection of TN cells if the reference point does not be associated with a PLMN supported for the UE.

In the above embodiments, the location information of reference points is contained in a SIB to be broadcasted to the UE. In another embodiment, the location information of reference points may be implemented in other manners. For example, more than one SIB may include different information of cell search for intra-frequency, inter-frequency, inter-RAT cell reselection, respectively. In other words, the location information of reference points is dedicated to the intra-frequency, inter-frequency, or inter-RAT cell reselection. Therefore, the UE may refer to a SIB when it needs to perform evaluation of cell search for intra-frequency cell reselection, refer to another when it needs to perform evaluation of cell search for inter-frequency cell reselection, and refer to one another SIB when it needs to perform evaluation of cell search for intra-RAT cell reselection, respectively. In this embodiment, the location information of reference points (and may further include the associated information of frequency priority) of cell search for different types of cell reselection is respectively contained in the corresponding system information block.

If the location information of reference points is contained in a single SIB, the location information of reference points may include reference points commonly associated with various frequencies and RATs; hence, this location information of reference points may include information of a large amount of reference points. Considering the limitation of SIB size, including the location information of reference points of cell search for intra-frequency cell reselection, inter-frequency cell reselection and inter-RAT cell reselection in different SIBs respectively is beneficial to limited SIB payload size.

If the location information of reference points is associated with cell search for intra-frequency cell reselection, the gNB may provide the location information of reference points as a part of a field (e.g., intraFreqCellReselectionInfo) of a SIB, which is dedicated to cell search for intra-frequency cell reselection. If the location information of reference points is associated with cell search for inter-frequency cell reselection, the gNB may provide the location information of reference points as a part of a field (e.g., interFreqCellReselectionInfo) of a SIB, which is dedicated to cell search for inter-frequency cell reselection. If the location information of reference points is associated with cell search for inter-RAT cell reselection, the gNB may include the location information of reference points in a field of a SIB. For example, the gNB may provide the location information of reference points as a part of a field associated with a RAT (e.g., CarrierFreqEUTRA) of a SIB, or may provide the location information of reference points as a part of the RAT specific information field of a SIB.

If the location information of reference points is contained in an information field of a SIB for intra-frequency cell search for cell reselection, the information field may indicate the location information of reference points associated with the indicated PCI (Physical Cell Identity). Each item of the location information of reference points may indicate the position associated with the TN cell or the access point associated with the cell, such as AGNSS positioning information. In addition to a cell and/or the access point of a TN cell (e.g., a gNB), a reference point may also be a landmark of the city, where an item of the location information of reference points may indicate the position of a harbor, airport, etc.

If the location information of reference points is associated with cell search for inter-frequency cell reselection, the UE may refer to the location information of reference points for inter-frequency cell reselection, including selecting a specific carrier frequency to perform cell search. Therefore, the information field of a reference point may indicate there may be cells operated in the specific carrier frequency corresponding to an item of the location information of reference points. Each reference point may further be associated with an identity, which uniquely identifies the reference point. Similarly, an item of the location information of the reference points may indicate the position associated with a TN cell or an access point associated with the cell, such as AGNSS positioning information. In addition to a cell and/or the access point of a TN cell (e.g., a gNB), a reference point may also be a landmark of the city, where an item of the location information of reference points may indicate the position of a harbor, airport, etc. The location information of reference points associated with cell search for inter-frequency cell reselection may be included in the NR multi-band information field (e.g., NR-MultiBandInfo).

If the location information of reference points is associated with cell search for inter-RAT cell reselection, the UE may refer to the location information of reference points for inter-RAT cell reselection, including selecting a specific carrier frequency to perform cell search. The configurations of the location information of reference points for inter-RAT cell search for cell reselection in a SIB are similar to the configurations of the location information of reference points for inter-frequency cell search for cell reselection in another SIB, and will not be detailed herein. The location information of reference points associated with cell search for inter-RAT cell reselection may be included in the RAT dependent multiband information field (e.g., EUTRA-MultiBandInfo), which may indicate the inter-RAT cell reselection as being transferred to a long-term evolution (LTE) network or other specific RAT.

As mentioned above, the location information of reference points may further include a PLMN ID list corresponding to the reference point(s).

In an embodiment of cell search for cell reselection evaluation process, the cell search evaluation process may be utilized in a UE in an inactive mode or an idle mode served by (e.g., camped on) a serving cell of a first network (e.g., NTN), for handling cell search for cell reselection. The cell search evaluation process includes the following steps:
1. Start.
2. Determine whether the cell search for cell reselection information comprises location information of reference points.
   (1) If yes,
      i. Determine whether at least one item of the location information of reference points suggests that a reference point of a second network is in a reachable distance of the UE (e.g., by UE estimating the distance between the reference point and the UE).
         1. If yes, search the frequency of the second network associated with the at least one reference point of a second network in a reachable distance of the UE;
         2. otherwise, stop searching the frequency of the second network if started.
   (2) Otherwise, perform cell selection or reselection evaluation without considering location information of reference points.
3. End.

A UE may start to perform cell search evaluation process periodically and/or when the signal strength or quality of the serving cell is less than a threshold and/or when the cell search for cell reselection information received by the UE indicates a higher priority frequency than the frequency priority of the currently camped serving cell, and/or when system information is successfully acquired from the serving cell, and/or according to a time domain estimation value (for example, based on the moving velocity and the distance between the UE location (e.g., obtained by the UE via a GPS module) and an item of the location information of reference points, or based on the orbit and the moving velocity of the satellite providing services and functionalities of the serving cell, etc.) is less than a threshold. The UE may perform the evaluation of cell search for cell reselection based on the cell search for cell reselection information and/or the location information of reference points therein.

Figure 5:
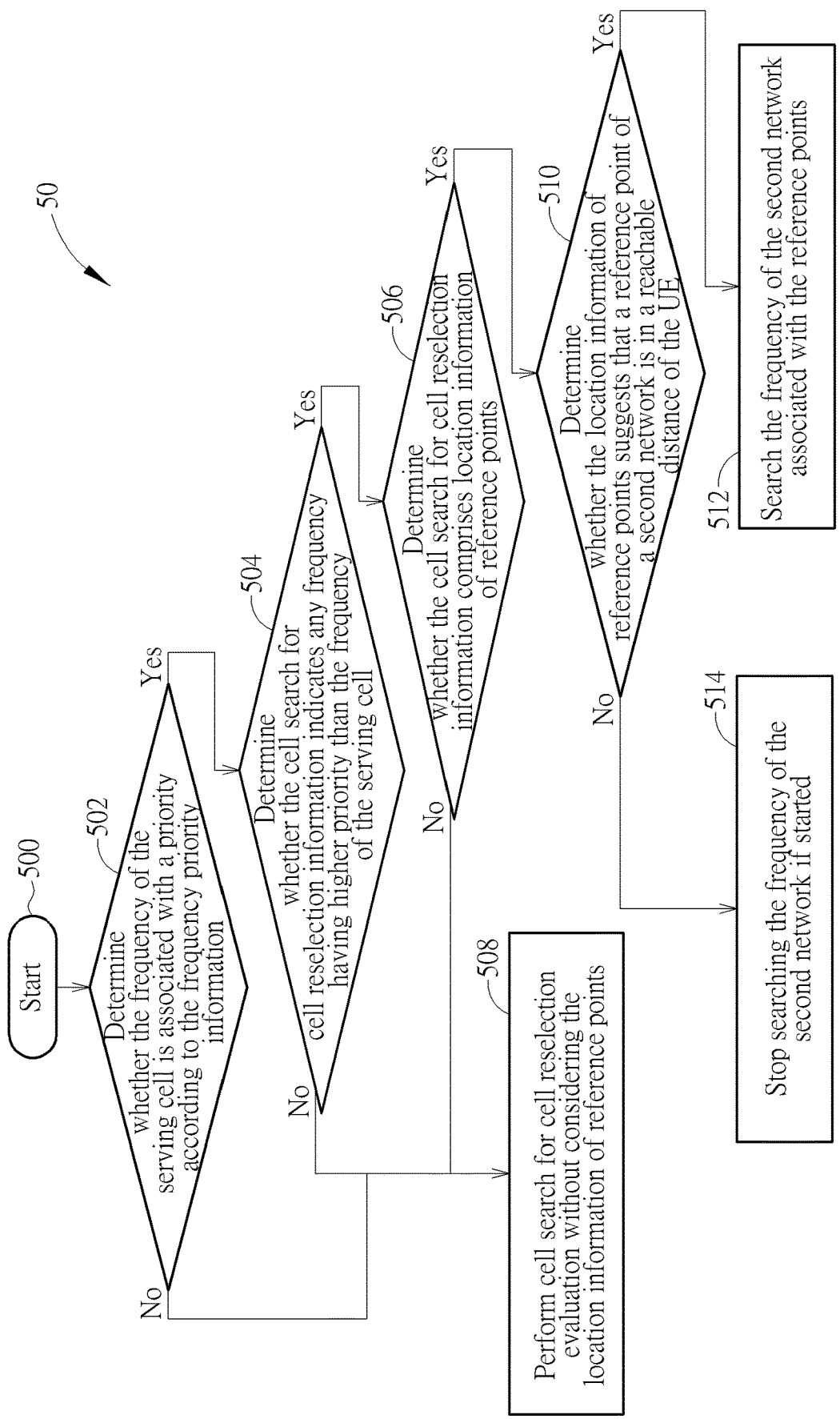
FIG. 5 is a flowchart of a cell selection or reselection evaluation process according to an embodiment of the present invention.

Please refer to FIG. 5, which is a flowchart of a cell search for cell reselection evaluation process 50 according to another embodiment of the present invention. The cell search for cell reselection evaluation process 50 may be utilized in a UE in an inactive mode or an idle mode served by (e.g., camped on) a serving cell of a first network (e.g., NTN), for handling cell search for cell reselection. The cell search for cell reselection evaluation process 50 may be compiled into the program code 314 and includes the following steps:
Step 500: Start.
Step 502: Determine whether the frequency of the serving cell is associated with a priority according to the frequency priority information. If yes, go to Step 504; otherwise, go to Step 508.

Step 504: Determine whether the cell search for cell reselection information indicates any frequency having higher priority than the frequency of the serving cell. If yes, go to Step 506; otherwise, to go Step 508.
Step 506: Determine whether the cell search for cell reselection information comprises location information of reference points. If yes, go to Step 510; otherwise, go to Step 508.
Step 508: Perform cell search for cell reselection evaluation without considering the location information of reference points.
Step 510: Determine whether the location information of reference points suggests that a reference point of a second network is in a reachable distance of the UE. If yes, go to Step 512; otherwise, go to Step 514.
Step 512: Search the frequency of the second network associated with the reference points.
Step 514: Stop searching the frequency of the second network if started.

First, the UE may be served by (e.g., camped on) a serving cell of a first network such as the NTN, and the UE may determine whether the frequency of the serving cell is associated with a priority according to the frequency priority information (Step 502). The frequency priority information may be acquired by the UE in several manners. For example, the UE may receive dedicated (i.e., UE specific) frequency priority information from a previously connected TN cell when the UE was released by the TN cell, where the frequency priority information is still valid when it is within a validity time or validity area (e.g., a list of NTN tracking area codes) if configured. Alternatively or additionally, the UE may receive dedicated (i.e., UE specific) frequency priority information from the NTN cell when the UE is released by the NTN cell. If the UE has no valid dedicated frequency priority information, the UE may perform cell search for cell reselection based on common frequency priority information, which may be received from the NTN cell through system information.

The cell search for cell reselection information may be received by the UE in any manner. In an embodiment, the cell search for cell reselection information (and its location information of reference points) may be provided from the cell on which the UE is camped, where the cell search for cell reselection information may be broadcasted to the UE through system information. In another embodiment, the cell search for cell reselection information (and its location information of reference points) may be provided from a previous serving cell of the UE and stored in the UE, and the cell selection or reselection information is still within a validity time or the validity area; that is, the cell search for cell reselection information is valid. This previous serving cell, which may be a serving cell on which the UE was camped or connected previously, may send the cell selection or reselection information to the UE when releasing the UE. In such a situation, the UE, as being released by the serving cell to be inactive, may still apply the cell selection or reselection information to perform evaluation of cell reselection.

If the UE determines that the frequency of the camped serving cell is not associated with any priority, the UE may perform the cell search for cell reselection evaluation without considering the priority associated with the frequency but according to the location information of reference points (Step 508). For example, the gNB may consider that all of its neighboring cells are provided by the same operator and have equal priority for the UE, and thus may not configure the cells with priority. In such a situation, the UE may perform the cell search for cell reselection evaluation process as being transferred in the TN coverage deployed in the city.

If the UE determines that the frequency of the camped serving cell is associated with a priority, the UE may further determine whether the cell search for cell reselection information indicates any frequency having higher priority than the frequency of the serving cell (Step 504). If yes, the UE may further consider the location information of reference points provided with the cell search for cell reselection information; otherwise, the UE may perform the cell search for cell reselection evaluation without considering the location information of reference points. For example, the serving cell on which the UE is camped is in an NTN, e.g., provided via a satellite, and the UE prefers a terrestrial system and thus a TN cell may have higher priority than the NTN cell. In such a situation, there may be a frequency of TN cell having higher priority than the NTN cell if the cell search for cell reselection information broadcasted by the NTN gNB indicates there is a neighboring TN cell within the coverage of this NTN cell. Therefore, the UE may further determine whether the cell selection/reselection information includes the location information of reference points (Step 506).

If the UE determines that there is no location information of reference points in the received cell search for cell reselection information, the UE may perform the cell search for cell reselection evaluation without considering the location information of reference points (Step 508). If the UE determines that the received cell search for cell reselection information includes the location information of reference points, the UE may refer to the location information of reference points for performing the evaluation of cell search for cell reselection. According to the location information of reference points, the UE may further determine whether to search the frequency of a neighboring cell of a second network (e.g., the TN cell). More specifically, the UE served by (e.g., camped on) the NTN cell may determine whether the location information of reference points suggests that a reference point of TN is in the reachable distance of the UE (Step 510), in order to determine whether to start the cell search for cell reselection of the TN cell.

Therefore, when the UE estimates and determines the location information of reference points suggesting that there is a reference point associated with TN in the reachable distance of the UE, the UE may search the frequency of the TN cell associated with the reference point. On the contrary, when the UE estimates and determines the location information of reference points suggesting that there is no reference point associated with TN in the reachable distance of the UE, the UE may stop or not start searching the frequency of TN. The UE may perform TN cell search for cell reselection by searching the frequency associated with TN only when the TN reference point corresponding to the frequency is in the reachable distance of the UE. As a result, the problem that the UE wastes power to perform cell search for cell reselection of TN cells even if it is far away from TN cells may be alleviated.

The reachable distance of the UE may be determined in any manner. In an embodiment, a reference point is determined to be in the reachable distance if the location information of reference points associated with the reference point indicates that the distance between the location of the reference point and the location of the UE (e.g., GPS/GNSS location) is less than a distance threshold. The distance threshold may be configured by the current serving cell, by the previous serving cell of the same or different network, or by standard specification. Additionally, the UE may further determine whether it is approaching the reference point, for example, the distance between the location of the reference point and the location of the UE is reducing. The evaluation of the distance between the location of the reference point and the location of the UE may be periodic, or according to the location of the UE (e.g., the NTN tracking area associated with the UE location), or according to the RSRP/RSRQ of the current serving cell, etc. The distance between the location of the reference point may be an average value of the values of multiple distance between the location of the reference point evaluated in a period of time, wherein the period of time may be configured by the current serving cell or by the previous serving cell or by the standard specification.

In another embodiment, a reference point is determined to be in a reachable distance if the location information of reference points associated with a reference point indicates that the distance between the location of the reference point and the location of the UE (e.g., GPS/GNSS location) is less than a distance threshold, the moving velocity of the UE is greater than a velocity threshold, and the UE is approaching the reference point. More specifically, in this embodiment, the UE evaluates both the distance information and the velocity information. The distance and velocity thresholds may be configured by the current serving cell, by the previous serving cell of the same or different network, or by standard specification. The UE may evaluate the moving velocity based on the GPS information of the UE. As a result, the UE may estimate the time it takes to reach or approach the reference point, so as to determine when to start cell search for cell reselection of the target network such as TN.

In another embodiment, the reachable distance between the location of a reference point and the location information of the UE may be determined based on time information, which may be provided associated with the cell search for cell reselection information received from a camped network, or stored in the UE. For example, a reference point associated with the second network (e.g., the TN) is determined to be in the reachable distance if the prediction time for the UE to reach the second network (e.g., based on the distance between the location information of reference points associated with the reference point and the location information of the UE as well as the moving velocity of the UE) is less than a value of time threshold. The time threshold may be provided associated with the cell search for cell reselection information to be received from a camped network, or stored in the UE. If the timing criterion is met and the UE is approaching or moving closer to the reference point, the reference point may be determined to be in the reachable distance of the UE.

In a further embodiment, the UE may determine whether the reference point is in its reachable distance without receiving the location or time information of the reference point from the current serving cell. In such a situation, the UE may perform the determination based on the GIS information. In other words, a reference point is determined to be in a reachable distance if the distance between the location of the reference point specified in the GIS information and the location of the UE is estimated to be less than a distance threshold. In addition, the condition of whether the UE is approaching or moving closer to the reference point may also be taken into account.

In an embodiment, if the location information of reference points indicates that the reference point is evaluated as not in the reachable distance of the UE, further evaluation may be performed. In detail, if the UE is served by (e.g., camped on) an NTN cell while the UE prefers a TN cell (e.g., the priority of the TN cell is higher than the priority of the NTN cell), the UE may stop searching the frequency(s) associated with the preferred network for cell reselection such as cell search for cell reselection of a TN cell. The UE may still perform cell search for cell reselection of NTN cells. The UE may not resume or restart the cell search for cell reselection evaluation of whether to search for the TN cell until next successful acquisition of system information. Note that in the NTN communication system, the new system information may be broadcasted when a new satellite arrives and the UE enters the coverage of the serving cell associated with the satellite. Therefore, the UE may preferably restart to perform the evaluation of cell search for cell reselection when receiving the new system information. In an embodiment, a timer may be configured for restarting of the evaluation of cell search for cell reselection; hence, after the cell search is stopped, the UE may restart or resume the cell search evaluation of TN cells according to the expiry of the timer.

In another embodiment, if the UE is served by (e.g., camped on) a TN cell while the UE prefers an NTN cell (i.e., the priority of the NTN cell is higher than the priority of the TN cell), the UE may stop searching the frequency(s) associated with the preferred network such as cell search for cell reselection of the NTN cell. Afterwards, the UE may resume or restart the searching for the NTN cell by referring the ephemeris information associated with the satellites (and may further take account GPS/GNSS location information of the UE). According to the ephemeris information, the UE will know when the NTN cell corresponding to a specific satellite arrives at a designated position that can serve the UE, so as to estimate and determine when to restart the cell search for cell reselection of the preferred NTN cell.

In an embodiment, the UE may further determine whether the location information of reference points includes or indicates a PLMN ID or PLMN ID list supported by the UE. For example, before the step of determining whether the reference point is in the reachable distance of the UE (e.g., Step 510 of the cell selection or reselection evaluation process 50), the UE may further determine whether there is a supported PLMN associated with the location information of reference points. In such a situation, the UE may perform cell search for cell reselection only when the reference point is in the reachable distance and there is at least one of the supported PLMN of the UE associated with the reachable reference point. As mentioned above, the supported PLMN may include, but is not limited to, a registered PLMN (RPLMN), an equivalent RPLMN (ERPLMN), a home PLMN (HPLMN), and an equivalent HPLMN (EHPLMN). As a result, the UE may perform cell search for cell reselection to search the frequency when the location information of reference points indicates that a neighbor cell (e.g., TN cell) of the preferred network is in a reachable distance of the UE and the neighboring cell serves for at least one of the PLMN supported by the UE.

In addition, the UE is requested to determine whether to keep or release the configuration of cell search information (may include the location information associated with the reference points) previously acquired from a serving cell. For example, the UE may be served by a TN cell, and then transferred to an NTN cell when the UE leaves the TN cell coverage. The UE may be configured with configuration of cell search information for performing cell search for cell reselection when the UE is served by (e.g., camped on) the TN cell. After the UE leaves the TN cell coverage and fails to access the TN cell, the UE should determine whether the configuration of cell search is still valid. In an embodiment, the UE may stop/suspend applying and store the configuration of cell search information when it is served by (e.g., camped on) the NTN cell, and start/resume applying the configuration of cell search information when at least one of the reference point associated with TN cell is determined to be in a reachable distance according to the location information of reference points. Alternatively, the UE may release or discard the configuration of cell search information.

Figure 6:
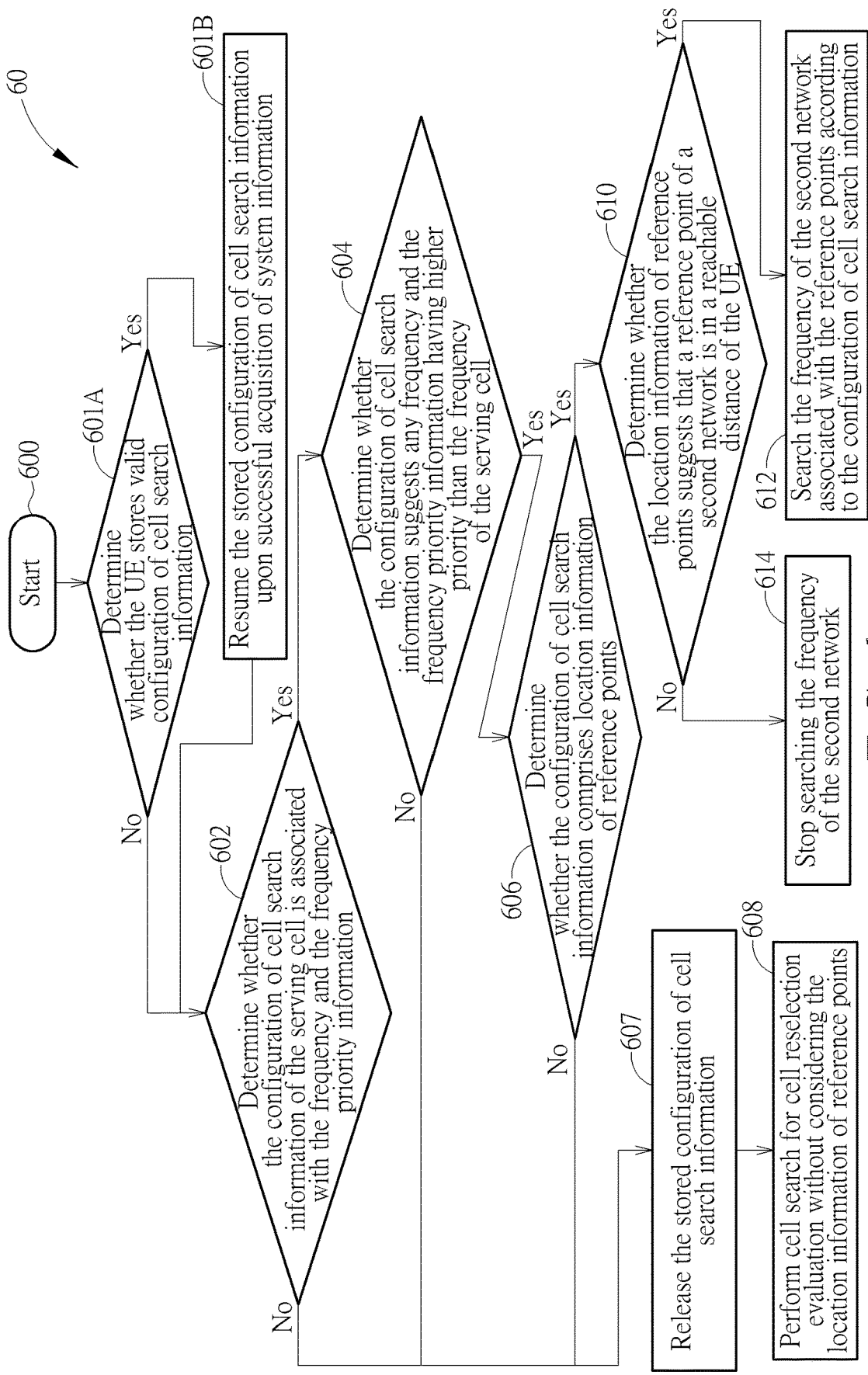
FIG. 6 is a flowchart of a cell selection or reselection evaluation process according to an embodiment of the present invention.

Please refer to FIG. 6, which is a flowchart of a cell search for cell reselection evaluation process 60 according to an embodiment of the present invention. The cell search for cell reselection evaluation process 60 may be utilized in a UE in an inactive mode or an idle mode served by (e.g., camped on) a serving cell of a first network (e.g., NTN), for handling cell search for cell reselection. The cell search for cell reselection evaluation process 60 may be compiled into the program code 314 and includes the following steps:

Step 600: Start.

Step 601A: Determine whether the UE stores valid configuration of cell search information. If yes, go to Step 601B; otherwise, go to Step 602.

Step 601B: Resume the stored configuration of cell search information upon successful acquisition of system information. Go to Step 602.

Step 602: Determine whether the configuration of cell search information of the serving cell is associated with the frequency and the frequency priority information. If yes, go to Step 604; otherwise, go to Step 607.

Step 604: Determine whether the configuration of cell search information suggests any frequency and the frequency priority information having higher priority than the frequency of the serving cell. If yes, go to Step 606; otherwise, to go Step 607.

Step 606: Determine whether the configuration of cell search information comprises location information of reference points. If yes, go to Step 610; otherwise, go to Step 607.

Step 607: Release the stored configuration of cell search information. Go to Step 608.

Step 608: Perform cell search for cell reselection evaluation without considering the location information of reference points.

Step 610: Determine whether the location information of reference points suggests that a reference point of a second network is in a reachable distance of the UE. If yes, go to Step 612; otherwise, go to Step 614.

Step 612: Search the frequency of the second network associated with the reference points according to the configuration of cell search information.

Step 614: Stop searching the frequency of the second network.

According to the cell search for cell reselection evaluation process 60, the UE may further consider the stored configuration of cell search information when performing the evaluation of cell search for cell reselection. Note that the UE may be in an inactive mode or an idle mode served by (e.g., camped on) an NTN cell and the UE may acquire configuration of cell search information which may include the frequency information associated with frequency priority information provided by a previous serving TN cell. The configuration of cell search information may be valid within the configured validity time or the configured validity area even if the UE leaves the coverage of the TN cell. In such a situation, the UE may determine whether the configuration of cell search information stored in the UE is valid (Step 601A) before performing the process of cell search for cell reselection evaluation. If the stored configuration of cell search information is valid, the UE may resume the stored configuration of cell search information, and perform the evaluation of cell search for cell reselection process according to the stored and resumed configuration of cell search information. The stored and resumed configuration of cell search information may further include the frequency and the frequency priority information, and the frequency information may further be associated with the information of location information of reference points. If the stored configuration of cell search information is not valid, the UE may perform the following steps based on the configuration of cell search information dedicated for the UE received from the current serving cell or common configuration of cell search information broadcasted from the current serving cell.

In the cell search for cell reselection evaluation process 60, the operations of Steps 602, 604 and 606 are respectively similar to those of Steps 502, 504 and 506 in the cell search for cell reselection evaluation process 50, and will not be detailed herein. Subsequently, when the UE applies stored and valid configuration of cell search information to perform cell search for cell reselection evaluation and if the UE determines that there is no frequency included in the configuration of cell search information associated with a priority higher than that of the current serving cell frequency, the UE may release the stored configuration of cell search information. In other words, the UE releases the stored configuration of cell search information when the frequency of the serving cell of the network (e.g., NTN network) on which the UE is camped associated with a priority higher than that of the frequencies indicated by the stored configuration of cell search information. In addition, the UE may release or discard the stored configuration of cell search information if the stored configuration of cell search information is invalid (e.g., exceeds a validity time, e.g., a corresponding timer is expired, e.g., not in a validity area).

In the cell search for cell reselection evaluation process 60, the operations of Steps 608, 610, 612 and 614 are respectively similar to those of Steps 508, 510, 512 and 514 in the cell selection or reselection evaluation process 50, and will not be detailed herein.

In an embodiment, the UE may further determine whether the location information of reference points associated with a PLMN ID or a PLMN ID list supported by the UE. For example, before the step of determining whether the reference point is in the reachable distance of the UE (e.g., Step 610 of the cell selection or reselection evaluation process 60), the UE may further determine whether there is a supported PLMN associated with the location information of reference points. In other words, the abovementioned operations of including the PLMN information are also applicable to the embodiments associated with the cell search for cell reselection evaluation process 60. The detailed implementations and operations of including the PLMN information are similar to those described in the above paragraphs, and will be omitted herein.

Please note that after the stored configuration of cell search information is released, the UE may resume or restart the cell search for cell reselection evaluation of whether to search for the TN cell upon successful acquisition of system information from the serving cell after releasing the stored configuration of cell search information, which may be received when a specific satellite arrives at a designated position that can serve the UE and the UE enters the coverage of its serving cell.

To sum up, the present invention aims at providing a method of handling cell search for cell reselection for a wireless communication system with coexistence of a TN and an NTN. If a UE is served by (e.g., camped on) the NTN cell, the gNB of the NTN may transmit location information of reference points associated with the coverage of the NTN cell to the UE. In an embodiment, the configuration of cell search information includes location information of reference points may be provided through system information. The location information of reference points may indicate the positions of the reference points, allowing the UE to determine whether to perform cell search for cell reselection according to the location information of reference points. The location information of reference points may indicate the access point of the TN cell and/or the geographic position where the TN cell is deployed. Therefore, the UE may perform evaluation of cell search for cell reselection according to the received location information of reference points.

More specifically, the UE may search the frequencies for cell search for cell reselection when the UE estimates and determines the location information of reference points suggesting that there is a reference point in the reachable distance of the UE; otherwise, the UE may stop searching the frequencies for cell search for cell reselection when the UE estimates and determines the location information of reference points suggesting that there is no reference point in the reachable distance of the UE. In an embodiment, the configuration of cell search information further includes frequencies of neighboring cells and may associate frequency priority information with the frequencies. The UE may further consider the frequency priority information for evaluation of cell search for cell reselection, where the configuration of cell search information may be received from a previous serving cell of the UE and stored in the UE. The UE may check the validity of the configuration of cell search information, and determine to resume the configuration of cell search information during evaluation of cell search for cell reselection if the configuration of cell search information is valid. If the UE determines that it is served by (e.g., camped on) the frequency of the serving cell having a priority higher than the priority associated with the frequencies indicated by the configuration of cell search information, the UE may release the stored configuration of cell search information. Alternatively, the configuration of cell search information may be received from the currently camped serving cell or broadcasted through system information.

In an embodiment, the configuration of cell search information may include the location information of reference points, and an NTN cell may further transmit PLMN IDs associated with the reference points to the UE, where the UE may perform evaluation of cell search for cell reselection by taking the PLMN information into account. More specifically, the UE may perform cell search for cell reselection on a frequency if the at least one of the PLMN IDs associated with the frequency is supported by the UE.

As a result, in the embodiments of the present invention, according to the location information of reference points, the UE may not perform cell search of TN cells to prevent consuming battery power in searching for the TN cell when no TN cell is in a reachable distance, even if the frequency information of the TN cells is provided from the NTN serving cell and the priority of the TN frequency is higher than the serving cell. Only when the TN cell is in a reachable distance of the UE, the UE performs cell search for cell reselection for TN cells. Therefore, to alleviate the problem that the UE wastes power performing cell search for cell reselection even if TN cells is not in a reachable distance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of providing configuration of cell search information for a network device, the method comprising:
    transmitting at least one location information of reference points for the configuration of cell search information for at least one mobile device to determine whether to perform cell search for cell reselection of a terrestrial network (TN) according to the configuration of cell search information;
    wherein the location information of reference points comprises at least one of a value of an assisted global navigation satellite system (AGNSS), a value of an assisted global positioning system (AGPS), or a value of the longitude and latitude associated with a geographic location;
    wherein the network device is in a non-terrestrial network (NTN) having a serving cell on which the at least one mobile device is allowed to camp.

2. The method of claim 1, wherein the location information of reference points is contained in system information to be broadcasted.

3. The method of claim 1, wherein the location information of reference points is associated with at least one carrier frequency on which cell search is to be performed by the mobile device.

4. The method of claim 1, wherein the location information of reference points is commonly applicable to intra-frequency, inter-frequency, and inter radio access technologies (inter-RAT) cell search.

5. The method of claim 1, wherein the location information of reference points is dedicated to intra-frequency, inter-frequency, or inter-RAT cell search.

6. The method of claim 1, wherein the location information of reference points is applicable to cell search when performing cell reselection.

7. The method of claim 1, wherein the location information of reference points is applicable to cell search when performing connection resume.

8. The method of claim 1, wherein the location information of reference points is associated with at least one radio access technology (RAT).

9. The method of claim 1, further comprising:
    configuring threshold values for the mobile device to perform cell search of the TN when the location information of reference points corresponding to the TN is determined by the mobile device to be in a reachable distance of the mobile device.

10. The method of claim 1, further comprising:
    configuring threshold values for the mobile device to stop performing cell search of the TN when the location information of reference points corresponding to the TN is determined by the mobile device to be not in a reachable distance of the mobile device.

11. The method of claim 1, wherein the location information of reference points is further associated with an identity of the reference point;
    wherein the identity of the reference point comprises at least one of a sequence number of the reference point, an identity of a TN tracking area, an identity of a TN access node, an identity of a TN cell, an identity of an NTN tracking area, an identity of an NTN gateway, an identity of a NTN access node, or an identity of a geographical location.

12. The method of claim 1, wherein the location information of reference points is associated with at least one public land mobile network (PLMN) identity of a PLMN operator that provides terrestrial network services corresponding to the location information of reference points.

13. A network device being configured to provide configuration of cell search information for at least one mobile device in performing cell search and comprising:
    a processor, configured to execute a program code; and
    a memory, coupled to the processor, configured to store the program code which instructs the processor to perform the following step:
        transmitting at least one location information of reference points for the configuration of cell search information for the at least one mobile device to determine whether to perform cell search for cell reselection of a terrestrial network (TN) according to the configuration of cell search information;
    wherein the location information of reference points comprises at least one of a value of an assisted global navigation satellite system (AGNSS), a value of an assisted global positioning system (AGPS), or a value of the longitude and latitude associated with a geographic location;
    wherein the network device is in a non-terrestrial network (NTN) having a serving cell on which the at least one mobile device is allowed to camp.

14. The network device of claim 13, wherein the processor is further configured to perform the following step:
    transmitting configuration of threshold values for the mobile device to determine whether to perform cell search according to the location information of reference points.

15. A method of handling cell search for a mobile device, the method comprising:
    receiving configuration of cell search information comprising location information of reference points;
    performing a cell search evaluation according to the configuration of cell search information; and
    performing cell search of a terrestrial network (TN) according to the cell search evaluation;
    wherein the location information of reference points comprises at least one of a value of an assisted global navigation satellite system (AGNSS), a value of an assisted global positioning system (AGPS), or a value of the longitude and latitude associated with a geographic location;
    wherein the mobile device is in an inactive mode or an idle mode served by a serving cell of a non-terrestrial network (NTN).

16. The method of claim 15, wherein the location information of reference points is commonly applicable to intra-frequency, inter-frequency, and inter radio access technologies (inter-RAT) cell search.

17. The method of claim 15, wherein the location information of reference points is dedicated to intra-frequency, inter-frequency, or inter-RAT cell search.

18. The method of claim 15, wherein the location information of reference points further comprises at least one carrier frequency associated with the location information of reference points.

19. The method of claim 15, wherein the location information of reference points is associated with at least one PLMN identity of at least one PLMN operator that provides network services of the TN.

20. The method of claim 15, wherein the step of receiving the configuration of cell search information comprises:
receiving the configuration of cell search information from the NTN through system information.

21. The method of claim 15, wherein the step of receiving the configuration of cell search information comprises:
receiving the configuration of cell search configuration from the NTN when the NTN releases the connection with the mobile device.

22. The method of claim 15, wherein the cell search evaluation comprises:
determining whether to perform cell search of the TN according to at least one carrier frequency associated with the location information of reference points.

23. The method of claim 15, wherein the cell search evaluation further comprises:
determining whether to perform cell search of the TN according to the location information of reference points corresponding to the TN in a reachable distance of the mobile device.

24. The method of claim 23, further comprising:
determining whether to perform cell search of the TN according to at least one PLMN identity associated with the location information of reference points.

25. The method of claim 23, wherein the location information of reference points corresponding to the TN is determined to be in a reachable distance of the mobile device when the distance between at least one of the location information of reference points and the mobile device is less than a value of distance threshold.

26. The method of claim 23, wherein the location information of reference points corresponding to the TN is determined to be in the reachable distance of the mobile device when a prediction time for the mobile device to access the TN is less than a value of time threshold.

27. The method of claim 15, wherein the cell search evaluation further comprises:
determining whether to stop performing cell search evaluation of the TN according to none of the location information of reference points corresponding to the TN is in a reachable distance of the mobile device.

28. The method of claim 27, further comprising:
after stopping performing cell search evaluation of the TN, start performing cell search evaluation of the TN when successfully acquiring system information from the NTN.

29. The method of claim 27, further comprising:
after stopping performing cell search evaluation of the TN, start performing cell search evaluation of the TN according to the expiry of a timer.

30. The method of claim 15, wherein the configuration of cell search information is stored in the mobile device and received from a third network on which the mobile device is previously camped, and the method further comprises:
determining whether the stored configuration of cell search information is valid, and
applying the configuration of cell search information if the configuration of cell search information is valid.

31. The method of claim 30, further comprising:
releasing the stored configuration of cell search information when acquiring system information or upon receiving a configuration of cell search information from the serving cell.

32. A mobile device configured to perform cell search, the mobile device comprising:
a processor, configured to execute a program code; and
a memory, coupled to the processor, configured to store the program code which instructs the processor to perform the following steps:
receiving configuration of cell search information comprising location information of reference points;
performing a cell search evaluation according to the configuration of cell search information; and
performing cell search of a terrestrial network (TN) according to the cell search evaluation;
wherein the location information of reference points comprises at least one of a value of an assisted global navigation satellite system (AGNSS), a value of an assisted global positioning system (AGPS), or a value of the longitude and latitude associated with a geographic location;
wherein the mobile device is in an inactive mode or an idle mode served by a serving cell of a non-terrestrial network (NTN).

* * * * *